(12) United States Patent
Minato et al.

(10) Patent No.: US 12,173,190 B2
(45) Date of Patent: Dec. 24, 2024

(54) METHOD FOR COATING RESIN MOLDED PRODUCT

(71) Applicant: MAZDA MOTOR CORPORATION, Hiroshima (JP)

(72) Inventors: Masaya Minato, Hiroshima (JP); Hiroshi Kubota, Hiroshima (JP); Masaaki Akamine, Hiroshima (JP); Yushi Matsuda, Hiroshima (JP); Kazuhiro Furuta, Hiroshima (JP); Takahiro Tanaka, Hiroshima (JP); Akira Andou, Hiroshima (JP); Tomohiro Nagano, Saitama (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 482 days.

(21) Appl. No.: 17/561,183

(22) Filed: Dec. 23, 2021

(65) Prior Publication Data
US 2022/0251402 A1 Aug. 11, 2022

(30) Foreign Application Priority Data
Feb. 9, 2021 (JP) .................................. 2021-019116

(51) Int. Cl.
*B05D 3/02* (2006.01)
*B05D 7/00* (2006.01)
(Continued)

(52) U.S. Cl.
CPC ................. *C09D 7/61* (2018.01); *B05D 3/02* (2013.01); *B05D 7/02* (2013.01); *B05D 7/546* (2013.01);
(Continued)

(58) Field of Classification Search
CPC .............. C09D 7/61; C09D 7/69; C09D 7/70; C09D 175/04; C09D 163/00; C09D 5/002;
(Continued)

(56) References Cited

U.S. PATENT DOCUMENTS

2017/0157804 A1* 6/2017 Takemoto ........... B29C 37/0028
2021/0087667 A1* 3/2021 Kusunoki ................. C23C 4/11

FOREIGN PATENT DOCUMENTS

| CN | 103102715 A | 5/2013 |
| CN | 104292749 A | 1/2015 |

(Continued)

OTHER PUBLICATIONS

Reinforced Thermoplastics: LFRT/GMT Roundup, Composites World (Aug. 1, 2007), https://www.compositesworld.com/articles/reinforced-thermoplastics-lfrtgmt-roundup (last visited Sep. 27, 2024). (Year: 2007).*

*Primary Examiner* — William P Fletcher, III
(74) *Attorney, Agent, or Firm* — Studebaker & Brackett PC (57) ABSTRACT

The present disclosure keeps a topcoat film 3 from having a dent 6 in a portion of its surface corresponding to a pinhole 4 of a resin molded product 1. A method of the present disclosure includes: applying an undercoat material to a resin molded product 1 to form an undercoat film 2; applying a topcoat material to a surface of the undercoat film 2 to form a topcoat film 3; and thermally curing the topcoat film 3. A coating material that contains a base resin having a larger volume expansion coefficient than the resin molded product 1 and a granular filler having a smaller volume expansion coefficient than the base resin and a number-average particle size of 2 μm or more to 12 μm or less is used as the undercoat material.

7 Claims, 5 Drawing Sheets

(51) Int. Cl.
  *B05D 7/02*      (2006.01)
  *C08K 3/22*      (2006.01)
  *C08K 7/18*      (2006.01)
  *C09D 7/40*      (2018.01)
  *C09D 7/61*      (2018.01)
  *C09D 175/04*    (2006.01)

(52) U.S. Cl.
  CPC ............... *C08K 3/22* (2013.01); *C08K 7/18* (2013.01); *C09D 7/69* (2018.01); *C09D 7/70* (2018.01); *C09D 175/04* (2013.01); *B05D 2201/02* (2013.01); *C08K 2003/2227* (2013.01); *C08K 2201/003* (2013.01)

(58) Field of Classification Search
  CPC .... C08K 3/22; C08K 7/18; C08K 2003/2227; C08K 2201/003; B05D 7/50; B05D 7/52; B05D 7/53; B05D 7/532; B05D 7/5323; B05D 7/534; B05D 7/536; B05D 3/02; B05D 2601/00; B05D 2601/20; B05D 2601/22
  See application file for complete search history.

(56) References Cited

FOREIGN PATENT DOCUMENTS

| | | | |
|---|---|---|---|
| JP | S6076568 A | * | 5/1985 |
| JP | H02-071877 A | | 3/1990 |
| JP | H05200355 A | * | 8/1993 |
| JP | 2008-246675 A | | 10/2008 |
| WO | 2019/208092 A1 | | 10/2019 |

* cited by examiner

METHOD FOR COATING RESIN MOLDED PRODUCT

CROSS-REFERENCE TO RELATED APPLICATION

This application claims priority to Japanese Patent Application No. 2021-19116 filed on Feb. 9, 2021, the entire disclosure of which is incorporated by reference herein.

BACKGROUND

A resin molded product formed by injection molding, press molding, or internal pressure molding has been known to have pinholes in its surface by the air mixed in a molding material. In particular, a carbon fiber-reinforced plastic (CFRP) product often has pinholes caused by the air between prepreg layers.

Japanese Unexamined Patent Publication No. 2008-246675 describes a method of producing a hollow fiber-reinforced plastic (FRP) product by internal pressure molding. In this method, an internal pressure bag wrapped with a prepreg is disposed between different prepregs for forming outer layers placed on the inner surfaces of upper and lower molding dies, and the internal pressure bag is air-pressurized to obtain a product with beautiful appearance.

As described in Japanese Unexamined Patent Publication No. H02-071877, a technique of applying an undercoat material, e.g., a primary surfacer, onto a surface of a FRP and applying a topcoat material to an undercoat film has been commonly used to improve finish quality of the coating.

However, in an observation of a surface of a topcoat film formed by applying the topcoat material on the polished surface of the undercoat film, dents are found in some cases at portions of a topcoat film corresponding to the respective pinholes of the molded resin product. This indicates the limits of the improvement in appearance of the coating on the resin molded product.

SUMMARY

In view of the foregoing background, the present disclosure is intended to improve the appearance of a coating on a resin molded product.

After the examination of the dents in the surface of the topcoat film, the inventors have obtained the following findings and achieved the present disclosure.

(1) Applying the topcoat material to the polished and smoothed surface of the undercoat film makes the surface of the topcoat film smooth.

(2) Thermally curing the topcoat film generates a dent in the surface of the topcoat film.

(3) The dent in the surface of the topcoat film is formed at a portion corresponding to a pinhole in the surface of the resin molded product. Specifically, the dent is formed in the surface of the topcoat film formed on the smooth surface of the undercoat film.

(4) The dent is formed when the undercoat film has a larger thermal expansion coefficient than the resin molded product.

(5) A portion of the undercoat film filling the pinhole of the resin molded product is locally increased in volume.

(6) When the topcoat film is heated to be cured, the portion of the undercoat film increased in volume thermally expands more than the surrounding portion, generating a local bulge. On the other hand, the topcoat film, which is uncured, generates a small bulge, or almost no bulge, at a corresponding portion of its surface. Thus, the portion becomes thinner than the surrounding portion.

(7) After the thermal curing of the topcoat film, the bulge of the undercoat film shrinks as cooled, and disappears. This causes the thinned portion of the topcoat film to sink, generating the above-described dent.

As a solution to the above-described problems, the present disclosure has reduced the difference between the volume expansion coefficient of the undercoat film and the volume expansion coefficient of the resin molded product.

A coating material disclosed herein is a coating material used for surface preparation of a resin molded product, the coating material containing a base resin and a filler, wherein the filler is a granular filler having a number-average particle size of 2 $\mu$m or more to 12 $\mu$m or less and a smaller volume expansion coefficient than the base resin.

The coating material, containing the filler having the smaller volume expansion coefficient than the base resin, is able to form an undercoat film on the surface of the resin molded product while keeping the difference in volume expansion coefficient between the undercoat film and the resin molded product small, even when the base resin itself has the larger volume expansion coefficient than the resin molded product. Thus, even if the surface of the resin molded product has a pinhole, the surface of the undercoat film above the pinhole is avoided from greatly bulging, and the surface of the topcoat film is kept from having a dent. With the increase in contact area between the filler in the undercoat film and the resin molded product, i.e., with the decrease in adhesion area between a resin portion of the undercoat film and the resin molded product, the adhesion between the undercoat film and the resin molded product decreases.

However, the filler, which is granular, does not increase the contact area between the filler and the resin molded product even when some particles of the filler come into contact with the surface of the resin molded product, unlike a flat-shaped filler. When the amount of the filler blended is kept unchanged, the contact area increases with the decrease in the particle size of the filler. Thus, the filler having a number-average particle size of 2 $\mu$m or more keeps the contact area from increasing in view of the particle size. This can easily maintain the adhesion between the undercoat film and the resin molded product even when the amount of the filler blended is increased to adjust the volume expansion coefficient. Use of a spherical filler as the filler of the present disclosure is suitable for maintaining the adhesion (keeping the contact area from increasing) and maintaining the fluidity (ease of application) of the undercoat material.

When a force of peeling the undercoat film off the resin molded product is applied, a stress is concentrated on the edges of some particles of the filler in contact with the resin molded product. The stress concentration increases with the decrease in the particle size of the filler. However, the filler having a number-average particle size of 2 $\mu$m or more can reduce the stress concentration, and thus, advantageously maintains the adhesion of the undercoat film to the resin molded product. The increase in the particle size of the filler lowers the fluidity of the coating material. Thus, the number-average particle size of the filler is suitably 12 $\mu$m or less for the ease of application.

As for the number-average particle size, the filler is observed using a scanning electron microscope, for example, to measure particle sizes of a plurality of filler particles (e.g., 100 particles), and an average thereof is taken as the number-average particle size.

The resin molded product is not limited to a particular use, and can be used for transport equipment, conveyance equipment, and office equipment, for example. The resin molded product is not limited to a fiber-reinforced resin molded product such as CFRP, and may be a resin molded product unreinforced with fibers.

In one embodiment, the volume expansion coefficient of the filler is ½ or less of the volume expansion coefficient of the base resin. This can reduce the volume expansion coefficient of the undercoat film without excessively increasing the amount of the filler blended.

In one embodiment, the ratio (volume concentration) of the filler blended in the undercoat film is 30% by volume or more to 45% by volume or less. This can easily bring the volume expansion coefficient of the undercoat film close to the volume expansion coefficient of the resin molded product.

Any material can be used as the filler. For example, an alumina filler, a silica filler, a calcium carbonate filler, and glass beads can be suitably used.

In one embodiment, the base resin of the coating material is a urethane-based resin or an epoxy-based resin.

A method disclosed herein is a method of coating a resin molded product, the method including:
applying an undercoat material to the resin molded product to form an undercoat film;
curing the undercoat film;
applying a topcoat material to a surface of the undercoat film to form a topcoat film; and
thermally curing the topcoat film, wherein
a coating material that contains a base resin having a larger volume expansion coefficient than the resin molded product and a filler having a smaller volume expansion coefficient than the base resin is used as the undercoat material, the filler being a granular filler having a number-average particle size of 2 μm or more to 12 μm or less.

In this method, the base resin of the undercoat material has a larger volume expansion coefficient than the resin molded product, and the undercoat material contains the filler having a smaller volume expansion coefficient than the base resin. This can reduce the volume expansion coefficient of the undercoat film made of the undercoat material. Specifically, the volume expansion coefficient of the undercoat film can be brought close to the volume expansion coefficient of the resin molded product.

Thus, even if the surface of the resin molded product has a pinhole, a portion of the undercoat film corresponding to the pinhole is avoided from thermally expanding into a large bulge when the topcoat film is thermally cured. This can avoid a portion of the topcoat film corresponding to the pinhole from thinning down, and thus, can keep the topcoat film from having a dent in its surface after cooling.

The filler is a granular filler having a number-average particle size of 2 μm or more and 12 μm or less. This can avoid an increase in contact area between the filler and the resin molded product, an increase in stress concentration when a force of peeling the undercoat film off the resin molded product is applied, and a decrease in fluidity of the undercoat material. Thus, the adhesion of the undercoat film to the resin molded product can be maintained without reducing the ease of application.

In one embodiment, the resin molded product is a long fiber-reinforced resin molded product. The long fiber-reinforced resin molded product tends to have a relatively large pinhole due to a large amount of air mixed into the molding material. In such a case, use of a granular filler having a smaller volume expansion coefficient than the base resin and a number-average particle size of 2 μm or more and 12 μm or less as the filler of the undercoat material can maintain the ease of application of the undercoat material and the adhesion of the undercoat film to the resin molded product, and can keep the surface of the topcoat film from having a dent caused by a pinhole of the resin molded product.

In one embodiment, the coating method further includes polishing the surface of the undercoat film between the curing of the undercoat film and the applying of the topcoat material to form the topcoat film. This can easily keep the surface of the topcoat film smooth. In other words, adjusting the volume expansion coefficient of the undercoat film using the filler can keep the surface of the topcoat film from having a dent caused by a pinhole of the resin molded product. Thus, the polishing for smoothing the surface of the undercoat film can contribute to the surface smoothness of the topcoat film.

In one embodiment, the volume expansion coefficient of the filler is ½ or less of the volume expansion coefficient of the base resin. This can reduce the volume expansion coefficient of the undercoat film without excessively increasing the amount of the filler blended.

In one embodiment, the filler is a spherical filler. This is advantageous for maintaining the adhesion of the undercoat film to the resin molded product (keeping the contact area from increasing) and maintaining the fluidity (ease of application) of the undercoat material.

In one embodiment, the filler is blended in a ratio of 30% by volume or more to 45% by volume or less. This can easily bring the volume expansion coefficient of the undercoat film close to the volume expansion coefficient of the resin molded product.

In one embodiment, a matrix resin of the resin molded product is an epoxy-based resin, and the base resin of the undercoat material is a urethane-based resin. The urethane-based resin has a larger volume expansion coefficient than the epoxy-based resin, and tends to leave the dent in the surface of the topcoat film. However, the filler blended in the undercoat material can keep the topcoat film from having the dent.

The present disclosure is also applicable when the matrix resin of the resin molded product and the base resin of the undercoat material are the same. This is because the resin molded product and the undercoat film using the same resin may have different thermal expansion coefficients depending on the types and amounts of a compounding agent and reinforcing fibers in the resin molded product.

Any material can be used as the filler. For example, an alumina filler, a silica filler, a calcium carbonate filler, and glass beads can be suitably used.

The resin molded product to be coated by the coating method is not limited to a particular use, and may be used for transport equipment, conveyance equipment, and office equipment, for example. The resin molded product is not limited to a fiber-reinforced resin molded product such as CFRP, and may be a resin molded product unreinforced with fibers.

DETAILED DESCRIPTION

An embodiment of the present disclosure will be described with reference to the drawings. The following description of a preferred embodiment is merely illustrative in nature and is not intended to limit applications or uses of the present disclosure.

Figure 1:
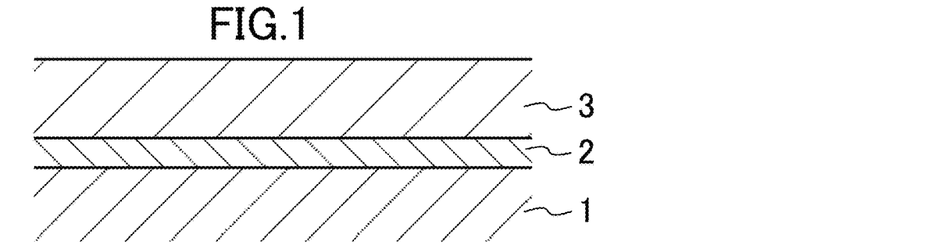
FIG. 1 is a cross-sectional view of a coated resin molded product.

As illustrated in FIG. 1, an undercoat material as a primer or a primer surfacer is applied to the surface of a resin molded product 1 to form an undercoat film 2, and final coating is performed on the undercoat film 2 to form a topcoat film 3.

An example of the resin molded product 1 is a fiber-reinforced resin molded product using a thermosetting resin as a matrix. The reinforcing fibers are, for example, carbon fibers (long fibers). Specific examples of the resin molded product (CFRP product) 1 include a product obtained by molding a layered fiber-reinforced resin material made of a stack of prepreg layers. The prepreg layers are sheet materials each made of a reinforcing fiber material impregnated with a thermosetting resin used as a matrix. The reinforcing fiber material is, for example, plain weaved, and contains bundles of carbon fibers oriented in a predetermined direction. The resin molded product 1 may contain no reinforcing fibers.

The resin molded product 1 can be used for vehicle components, i.e., engine components such as an engine cover, and vehicle exterior materials such as a bonnet, a rear fender, a roof, a door, a front panel, a rear panel, and a lift gate.

<Undercoat Material for Resin Molded Product>

Figure 2:
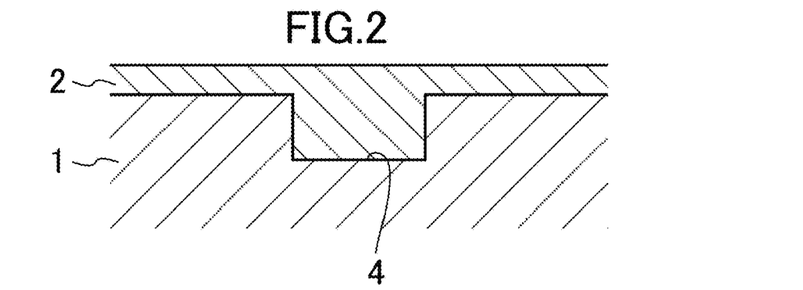
FIG. 2 is a cross-sectional view of a resin molded product on which an undercoat film is formed.

An undercoat material contains a base resin and a filler. The filler has a smaller volume expansion coefficient than the base resin, and is blended to adjust the volume expansion coefficient of the undercoat film 2. The undercoat material may be blended with a pigment for concealing a base color, i.e., the color of the resin molded product 1.

The base resin may be either a urethane-based resin or an epoxy-based resin.

Any material having a smaller volume expansion coefficient than the base resin can be used as the filler. Examples of such a material include alumina, silica, calcium carbonate, and glass beads.

The above-described typical base resin, filler, and resin molded product 1 have the following volume expansion coefficients. The volume expansion coefficient of the filler is $\frac{1}{2}$ or less, preferably $\frac{1}{5}$ or less, more preferably $\frac{1}{10}$ or less of the volume expansion coefficient of the base resin, and is preferably smaller than the volume expansion coefficient of the resin molded product 1.

Urethane-based resin: $30 \times 10^{-5}$/K to $60 \times 10^{-5}$/K
Epoxy-based resin: $13.5 \times 10^{-5}$/K to $25.5 \times 10^{-5}$/K
Alumina: $2.0 \times 10^{-5}$/K to $2.4 \times 10^{-5}$/K
Amorphous silica: $0.15 \times 10^{-5}$/K
Calcium carbonate: $7.5 \times 10^{-5}$/K to $9.0 \times 10^{-5}$/K
Glass beads: $1.5 \times 10^{-5}$/K to $2.7 \times 10^{-5}$/K
Resin molded product (CFRP product): $19.5 \times 10^{-5}$/K (as an example)

For reduction of an increase in contact area with the resin molded product 1, the filler needs to be granular, particularly preferably spherical.

The filler has a number-average particle size of 2 μm or more to 12 μm or less for reduction of the increase in contact area with the resin molded product 1, reduction of stress concentration when a force of peeling the undercoat film 2 off the resin molded product 1 is applied, and easy application of the undercoat material.

The ratio of the filler blended in the undercoat material is preferably 30% by volume or more to 45% by volume or less for reduction of the volume expansion coefficient of the undercoat film 2, i.e., bringing the volume expansion coefficient of the undercoat film 2 close to the volume expansion coefficient of the resin molded product 1, and easy application of the undercoat material.

The undercoat material may further contain a leveling agent, an anti-sag agent, a stabilizer, and a conductivity-imparting agent, if necessary.

<Method of Coating Resin Molded Product>

—Formation of Undercoat Film—

As shown in FIG. 2, the undercoat material is applied to the surface of the resin molded product 1 which needs to be coated, thereby forming the undercoat film 2. The undercoat material can be applied by spraying, airless spraying, or brushing, but the method of application is not limited to a particular one. The undercoat film 2 thus formed fills a pinhole 4 of the resin molded product 1.

The undercoat film 2 on a flat portion of the resin molded product 1 except for the pinhole 4 may have a thickness of, for example, about 10 μm or more to 100 μm or less, preferably 15 μm or more to 80 μm or less, more preferably 20 μm or more to 60 μm or less, after curing.

—Curing of Undercoat Film—

The undercoat material thus applied is air-dried at ordinary temperature for about 20 minutes to 60 minutes to be cured into the undercoat film 2. The undercoat film 2 can be thermally cured.

—Polishing of Undercoat Film—

The surface of the cured undercoat film 2 is polished as needed. Any suitable tool, such as sandpaper and a buffing cloth, can be used for the polishing. The polishing may be dry polishing, or wet polishing using water.

For enhanced surface smoothness of the undercoat film 2, the thickness of the undercoat film 2 is preferably 80% or more to 99% or less, more preferably 85% or more to 98% or less, much more preferably 90% or more to 97% or less, of its thickness before polishing.

—Formation of Topcoat Film—

Figure 3:
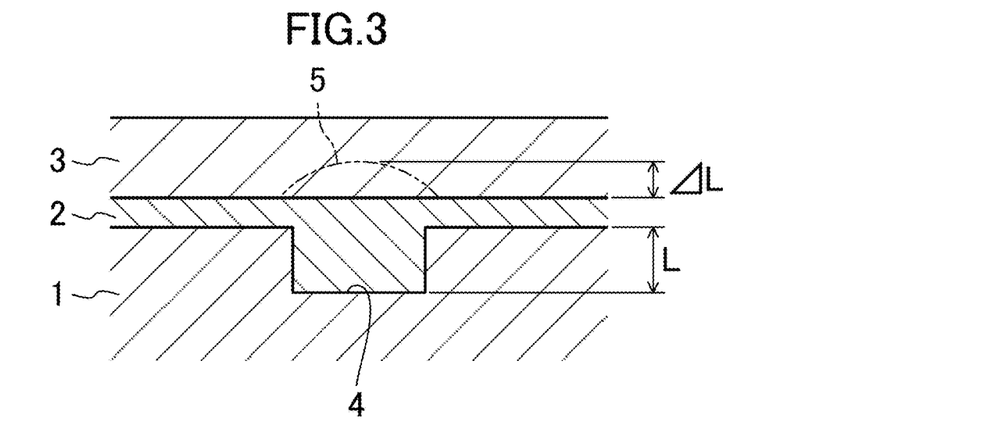
FIG. 3 is a cross-sectional view of a resin molded product on which an undercoat film and a topcoat film are formed, and a bulge of a surface of the undercoat film.

As shown in FIG. 3, final coating (application of a topcoat material) is performed on the cured undercoat film 2 to form a topcoat film 3. The topcoat material can be applied by spraying, airless spraying, brushing, or rotational atomization coating, but the method of application is not limited to a particular one. Various coating methods may be employed as the final coating. Examples thereof include a two-coat method of forming a solid coating and a transparent clear coating, and a three-coat method of forming a metallic coating, a color clear coating, and a transparent clear coating.

As for the thickness of the topcoat film 3 after curing, the clear coating has a thickness of, for example, 20 μm or more to 50 μm or less, and the other color coatings than the clear coating have a thickness of 10 μm or more to 40 μm or less, for example.

—Thermal Curing of Topcoat Film—

The resin molded product 1 on which the topcoat film 3 is formed is placed into a heating furnace, and held, for example, at a temperature of 100° C. or more to 130° C. or less for 10 minutes or more to 60 minutes or less, to cure the topcoat film 3.

When the undercoat film 2 contains no filler, the volume expansion coefficient of the base resin, which is $30 \times 10^{-5}$/K to $60 \times 10^{-5}$/K if the base resin is a urethane-based resin, dominates the volume expansion coefficient of the undercoat film 2, and is larger than the volume expansion coefficient of the resin molded product 1, which is $19.5 \times 10^{-5}$/K if the resin molded product 1 is a CFRP product. Thus, when heated for the curing of the topcoat film 3, a portion of the undercoat film 2 filling the pinhole 4 and having a larger volume thermally expands to form a large bulge 5 as indicated by a phantom line in FIG. 3. The topcoat film 3, which is uncured, generates almost no bulge at a portion corresponding to the pinhole 4. Thus, the portion of the topcoat film 3 corresponding to the pinhole 4 becomes thinner than the surrounding portion.

Thereafter, the bulge 5 of the undercoat film 2 shrinks as cooled, and disappears. As a result, the thinned portion of the topcoat film 3 sinks to form a dent 6 as indicated by a phantom line in FIG. 4.

Figure 4:
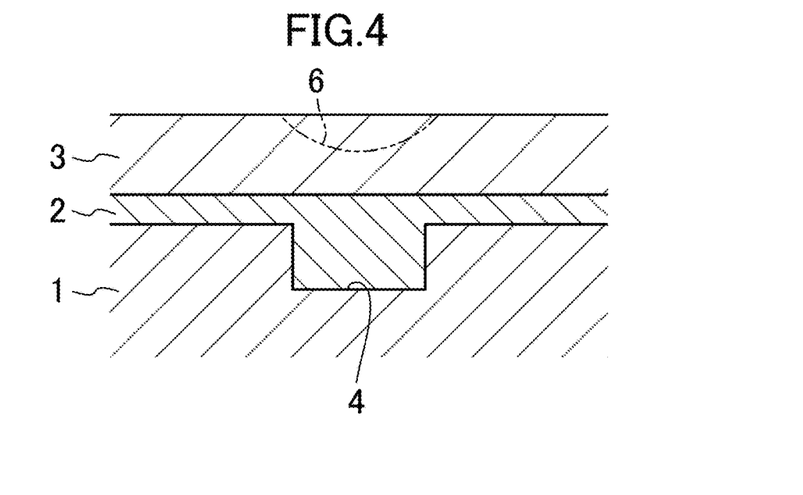
FIG. 4 is a cross-sectional view illustrating a resin molded product on which an undercoat film and a topcoat film are formed, and a dent in a surface of the topcoat film.

In contrast, according to the present embodiment, the undercoat material containing the filler brings the volume expansion coefficient of the undercoat film 2 close to the volume expansion coefficient of the resin molded product 1. Thus, when heated for the curing of the topcoat film 3, the portion of the undercoat film 2 filling the pinhole 4 and having a larger volume is kept from bulging. This can avoid the portion of the topcoat film 3 corresponding to the pinhole from thinning down, i.e., can avoid the formation of the dent.

<Confirmation of Dent Reduction Effect by Filler>

For confirmation of the dent reduction effect, two test pieces having the undercoat films of different volume expansion coefficients were formed as described below using an aluminum plate as a substitute of the resin molded product.

A pseudo pinhole having a diameter of 527 μm and a depth of 218 μm, i.e., a truncated conical recess having a diameter of 20 μm at the bottom, was formed in a smooth surface of the aluminum plate. The aluminum plate had a volume expansion coefficient of $7.5 \times 10^{-5}$/K.

A filler-free urethane-based resin coating material and a filler-containing urethane-based resin coating material were prepared as undercoat materials. Each of the undercoat materials was applied to the surface of the aluminum plate to form an undercoat film. Each of the undercoat films was polished to have a smooth surface, and a clear coating material as a topcoat material was applied thereon to form a topcoat film.

The undercoat film made of the filler-free undercoat material had a volume expansion coefficient of $40.5 \times 10^{-5}$/K. A difference Δα between the volume expansion coefficient of the undercoat film and the volume expansion coefficient of the aluminum plate was $33.0 \times 10^{-5}$/K. The undercoat film made of the filler-containing undercoat material had a volume expansion coefficient of $27.0 \times 10^{-5}$/K. A difference Δα between the volume expansion coefficient of the undercoat film and the volume expansion coefficient of the aluminum plate was $19.5 \times 10^{-5}$/K.

Each of the test pieces was heated from ordinary temperature to 100° C., and then slowly cooled to measure the chronological change of the heights of the surfaces of the undercoat film and the topcoat film above the pseudo pinhole.

Figure 5:
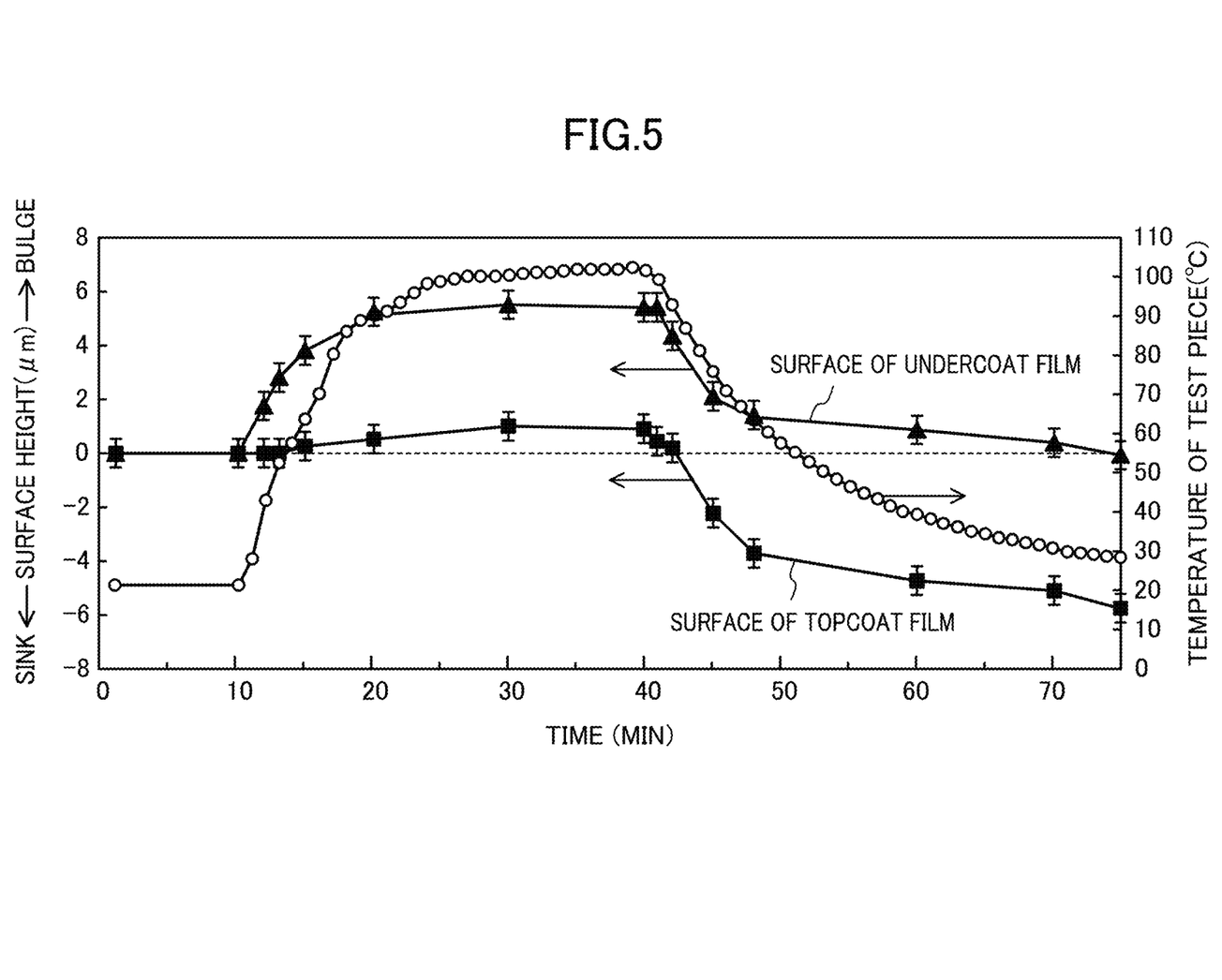
FIG. 5 is a graph showing chronological changes of the height of the surface of the undercoat film having a larger volume expansion coefficient and the height of the surface of the topcoat film, both above a pinhole, during thermal curing of the topcoat film.
Figure 6:
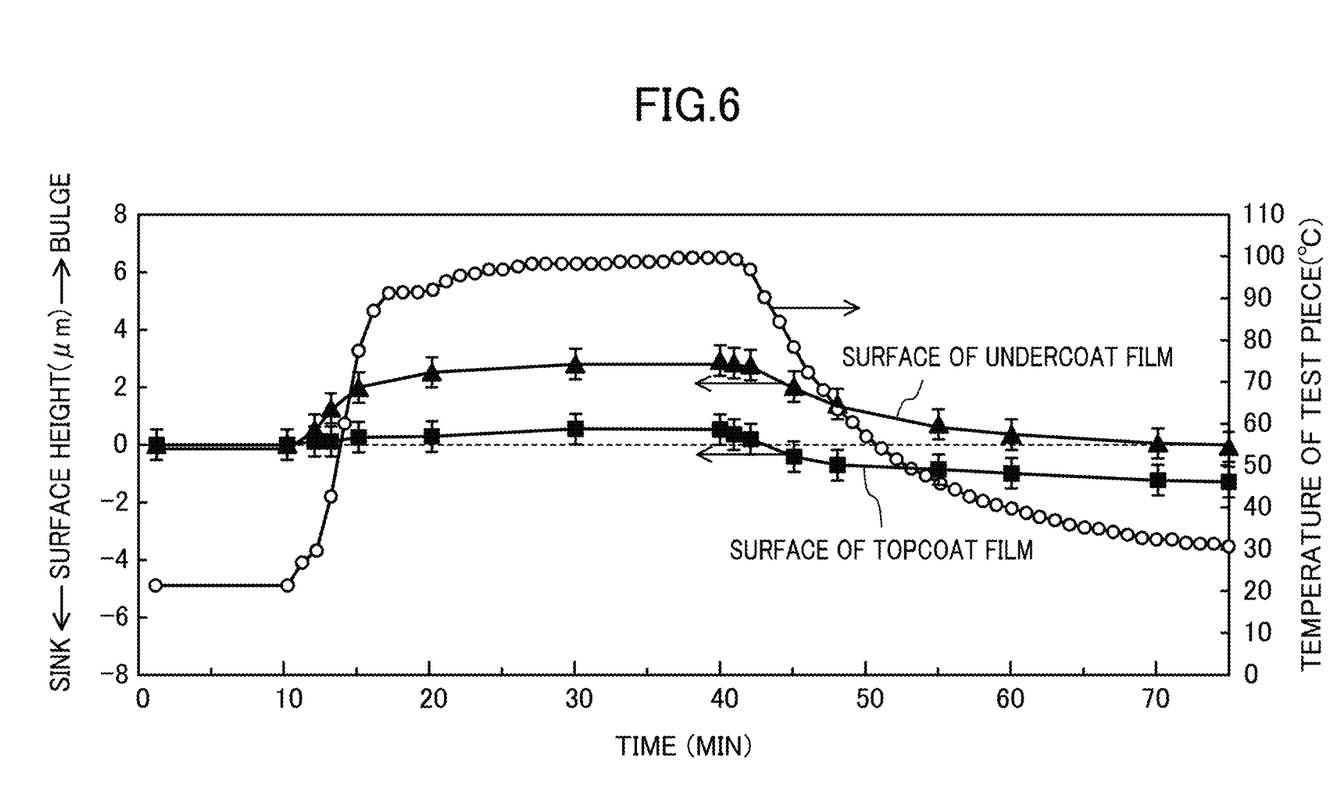
FIG. 6 is a graph showing chronological changes of the height of the surface of the undercoat film having a smaller volume expansion coefficient and the height of the surface of the topcoat film, both above a pinhole, during thermal curing of the topcoat film.

FIG. 5 shows the test results of the filler-free undercoat material ($\Delta\alpha = 33.0 \times 10^{-5}$/K), and FIG. 6 shows the test results of the filler-containing undercoat material ($\Delta\alpha = 19.5 \times 10^{-5}$/K).

First, in the former case with a larger difference in volume expansion coefficient (FIG. 5), the surface of the undercoat film greatly bulges to a height of about 6 μm as the temperature rises, and is lowered as the undercoat film is slowly cooled. The amount of bulge finally returns to zero. On the other hand, the surface of the topcoat film gently bulges as the temperature rises, but the amount of bulge is much smaller than that of the undercoat film. This indicates that the topcoat film above the pseudo pinhole is thinned. Then, the subsequent slow cooling causes the surface height of the topcoat film to decrease with the same tendency as the surface height of the undercoat film. That is, the topcoat film sinks to finally generate a dent having a depth of about 6 μm, which is equivalent to the height of the bulge of the undercoat film, in the surface of the topcoat film.

In the latter case with a smaller difference in volume expansion coefficient (FIG. 6), the surface of the undercoat film bulges as the temperature rises, but the amount of bulge is small. The surface of the topcoat film has only a slight bulge. This indicates that the topcoat film above the pseudo pinhole is slightly thinned. The subsequent slow cooling causes the surface of the undercoat film to be lowered, and the amount of bulge finally returns to zero. The height of the surface of the topcoat film is also lowered, but the dent finally left in the surface of the topcoat film is as shallow as about 1 μm.

The results indicate that bringing the volume expansion coefficient of the undercoat film close to the volume expansion coefficient of the resin molded product can keep the topcoat film from having the dent.

Suppose the pinhole 4 shown in FIG. 3 has a constant diameter throughout its depth L (μm), the temperature increase during the curing of the topcoat film is ΔT (K), and the difference in linear expansion coefficient between the undercoat film and the resin molded product is Δγ, the amount of bulge of the undercoat film ΔL (μm), i.e., the depth of the dent in the topcoat film, can be represented by the following formula (1).

$$\Delta L = 3 \times (\Delta\gamma \times L \times \Delta T) \tag{1}$$

The reason why ΔL is three times as large as ($\Delta\gamma \times L \times \Delta T$) is that the resin in the pinhole 4 is assumed to expand only in the upward direction. In the example of FIG. 5, when L=218 μm, ΔT=80K, and $\Delta\gamma = 11 \times 10^{-5}$/K are met, the height of bulge (the depth of the dent) ΔL is about 5.8 μm, which is approximate to the result of FIG. 5. When a relatively large dent is generated in the surface of the topcoat film, it can be said that the concept of how the dent is generated as described with reference to FIGS. 3 and 4 agrees with the actual generation of the dent.

<Adhesion of Undercoat Film to Resin Molded Product>

Figure 7:
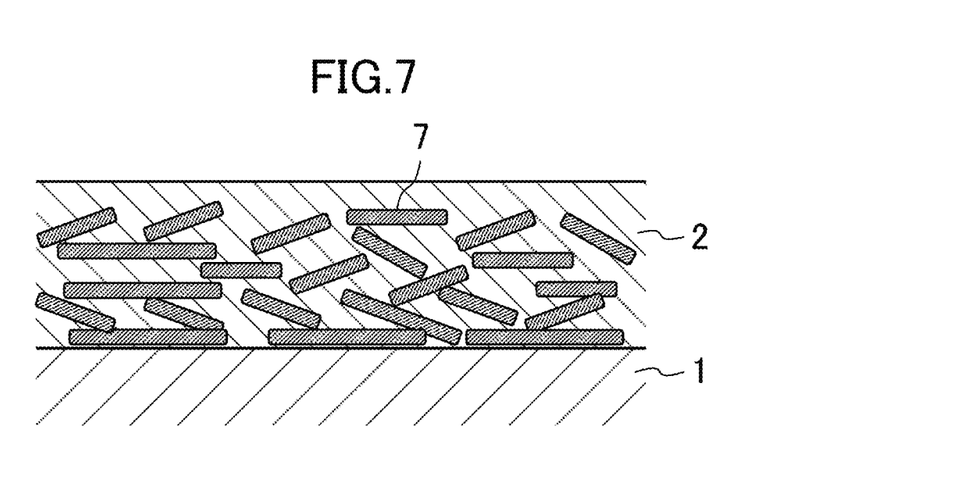
FIG. 7 is a cross-sectional view of a resin molded product on which an undercoat film containing a flat-shaped filler is formed.

When a flat-shaped filler is blended in the undercoat material to reduce the volume expansion coefficient of the undercoat film, some of the particles of the flat-shaped filler 7 lie in the undercoat film 2 and come into contact with the surface of the resin molded product 1 as shown in FIG. 7. This tends to increase the contact area between the filler 7 and the resin molded product 1. A portion of the surface of the resin molded product 1 in contact with the filler 7 may reduce the adhesion at the interface between the undercoat film 2 and the resin molded product 1. Specifically, the flat-shaped filler 7 tends to increase the contact area with the resin molded product 1, thereby reducing the adhesion of the undercoat film 2 to the resin molded product 1.

Figure 8:
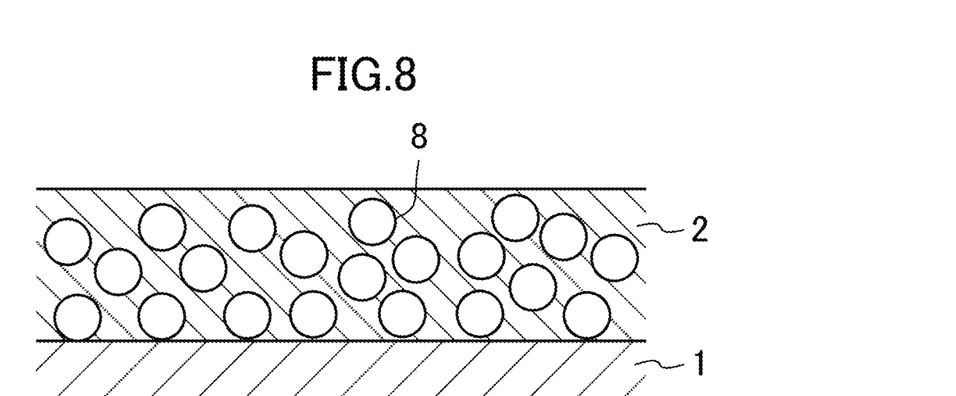
FIG. 8 is a cross-sectional view of a resin molded product on which an undercoat film containing a spherical filler is formed.

On the other hand, a granular filler, a spherical filler 8 in particular, does not increase the contact area between the filler 8 and the resin molded product 1 as shown in FIG. 8. Thus, significant drop of the adhesion of the undercoat film 2 to the resin molded product 1 can be avoided even when the filler 8 is blended in a relatively large amount in the undercoat film 2. This can maintain the adhesion of the undercoat film 2 to the resin molded product 1.

The following examination was conducted to check the influence of the shape of the filler contained in the undercoat film 2 on the contact area between the filler and the resin molded product 1.

For the examination, an undercoat material was applied to a polypropylene (PP) plate to form an undercoat film, and the undercoat film was peeled to analyze the surface of the PP plate that was in contact with the undercoat film using a scanning electron microscope (SEM). Then, an SEM image was binarized to calculate the rate of a contact surface (area ratio) of the filler relative to the whole contact area of the undercoat film. An epoxy-based resin was used as a base resin of the undercoat material, and the ratio of the filler blended was 32.3% by volume. As the examples of the filler, three types of flat alumina having particle sizes of 2.0 μm, 5.0 μm, and 9.0 μm, and three types of spherical alumina having particle sizes of 2.5 μm, 4.5 μm, and 10.5 μm were prepared, and the examination was conducted. Table 1 shows the results.

TABLE 1

|  | Size | Contact area ratio |
|---|---|---|
| Spherical alumina | 2.5 μm | 27.0% |
|  | 4.5 μm | 26.3% |
|  | 10.5 μm | 23.7% |
| Flat alumina | 2.0 μm | 47.5% |
|  | 5.0 μm | 36.1% |
|  | 9.0 μm | 31.5% |

Table 1 indicates, with the fillers blended in the same ratio, the spherical alumina had the smaller contact area than the flat alumina, and both of the flat alumina and the spherical alumina having the larger particle size had the smaller contact area than those having the smaller particle size.

When a force of peeling the undercoat film 2 off the resin molded product 1 is applied, a stress is concentrated on the edges of some particles of the filler in contact with the resin molded product. However, the spherical filler 8 shows less concentration of the stress than the flat-shaped filler 7. This is advantageous for maintaining the adhesion. The spherical filler 8 can also keep the fluidity of the undercoat material from decreasing.

Figure 9:
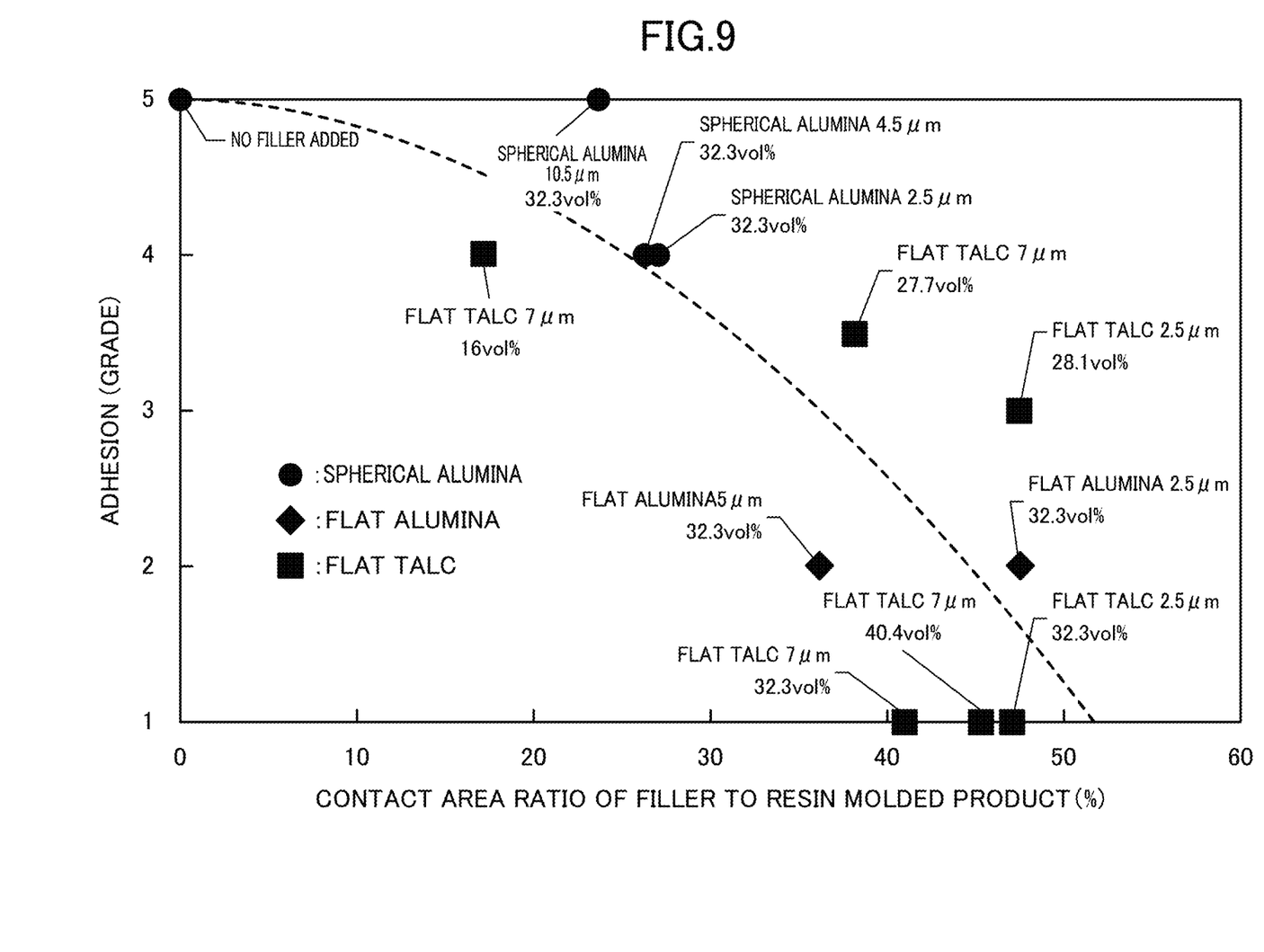
FIG. 9 is a graph showing a relationship between contact area ratios of different fillers to the resin molded product and adhesion of the undercoat film.

As the examples of the filler, two types of flat alumina having particle sizes of 2.0 μm and 5.0 μm, three types of spherical alumina having particle sizes of 2.5 μm, 4.5 μm and 10.5 μm, and two types of flat talc having particle sizes of 2.5 μm and 7 μm were prepared, and a peel test of the undercoat film was performed to evaluate the adhesion of the undercoat film 2 to the resin molded product 1. An epoxy-based resin was used as the base resin of the undercoat material. FIG. 9 shows the results. In the graph of FIG. 9, a numeric value with the unit "μm" and a numeric value with the unit "vol %" added to each plot indicate the particle size and the blending ratio of the filler in the undercoat film, respectively. The vertical axis of FIG. 9 represents the grade of adhesion, and the larger numerical value indicates the higher adhesion.

FIG. 9 indicates that the adhesion increases with the decrease in contact area ratio of the filler to the resin molded product. The contact area ratio is preferably 35% or less to achieve the adhesion of grade 3 or higher which causes no practical problem. The lower limit of the contact area ratio is about 10% because the filler needs to be blended in a certain amount to adjust the volume expansion coefficient of the undercoat film.

(Volume Expansion Coefficient and Blending Ratio of Filler)

The volume expansion coefficient $\beta$all of the undercoat film is represented by the following formula (2), where Vp and $\beta$p are the volume and volume expansion coefficient of the base resin, respectively, Vf and $\beta$f are the volume and volume expansion coefficient of the filler, respectively, and Vall is the volume of the undercoat film.

$$\beta\text{all} = (Vp \times \beta p + Vf \times \beta f)/V\text{all} \qquad (2)$$

Assuming that the ratio of the filler blended in the undercoat film is $\lambda = Vf/V\text{all}$, the formula (2) can be transformed into the formula (3) because $Vp/V\text{all} = 1-\lambda$ is met.

$$\beta\text{all} = \beta p \times (1-\lambda) + \beta f \times \lambda \qquad (3)$$

When the volume expansion coefficient $\beta$all of the undercoat film is equal to the volume expansion coefficient $\beta$b of the resin molded product, the filler blending ratio $\lambda$ is expressed by the following formula (4), where $\beta$all in the formula (3) is substituted with $\beta$b.

$$\lambda = (\beta p - \beta b)/(\beta p - \beta f) \qquad (4)$$

Specifically, when the volume expansion coefficient $\beta$f and blending ratio $\lambda$ of the filler are determined to meet the formula (4), the volume expansion coefficient $\beta$all of the undercoat film becomes equal to the volume expansion coefficient $\beta$h of the resin molded product, and the surface of the topcoat film is kept from having the dent even when the resin molded product has a pinhole.

Through consideration of the experimental results shown in FIGS. 5 and 6, the height of the bulge of the undercoat film $\Delta L$, i.e., the depth of the dent in the topcoat film, was estimated by the formula (1): $\Delta L = 3 \times (\Delta \gamma \times L \times \Delta T)$. Since $\Delta \gamma$ is the difference in linear expansion coefficient between the undercoat film and the resin molded product, the formula (1) can be expressed as follows when the difference in volume expansion coefficient $\Delta \alpha$ is used.

$$\Delta L = \Delta \alpha \times L \times \Delta T \qquad (5)$$

From the formula (5) where the depth of the pinhole L is 218 μm and the temperature increase ΔT during the thermal curing of the topcoat film is 80K, the value Δα is reduced to about $6\times10^{-5}$/K for the reduction of the depth of the dent ΔL in the topcoat film to about 1 μm, and the value Δα is reduced to about $12\times10^{-5}$/K for the reduction of ΔL to about 2 μm.

For example, if $\beta p=40\times10^{-5}$/K, $\beta b=18\times10^{-5}$/K, and $\beta f=2.4\times10^{-5}$/K are met, the volume expansion coefficient $\beta$all of the undercoat film is $28.72\times10^{-5}$/K from the formula (3) where the filler blending ratio λ is, for example, 0.3. Thus, $\Delta\alpha=10.72\times10^{-5}$/K is met, and the depth of the dent ΔL in the topcoat film is expected to be 2 μm or less.

If the filler blending ratio λ is 0.45, the volume expansion coefficient $\beta$all of the undercoat film is $23.08\times10^{-5}$/K and Δα is $5.08\times10^{-5}$/K. Thus, the depth of the dent ΔL of the topcoat film is expected to be 1 μm or less.

From the viewpoint of keeping the topcoat film from having the dent, a filler having a volume expansion coefficient $\beta f$ of $1.5\times10^{-5}$/K or more and $9.0\times10^{-5}$/K or less as mentioned above is preferably used in the blending ratio γ of 0.3 or more and 0.45 or less (30% or more and 45% or less).

What is claimed is:

1. A method of coating a resin molded product, the method comprising:
   applying an undercoat material to the resin molded product to form an undercoat film;
   curing the undercoat film;
   applying a topcoat material to a surface of the undercoat film to form a topcoat film; and
   thermally curing the topcoat film, wherein
   a coating material that contains a base resin having a larger volume expansion coefficient than the resin molded product and a filler having a smaller volume expansion coefficient than the base resin is used as the undercoat material, the filler being a granular filler having a number-average particle size of 2 μm or more to 12 μm or less.

2. The method of claim 1, wherein
the resin molded product is a long fiber-reinforced resin molded product.

3. The method of claim 1, further comprising:
polishing the surface of the undercoat film between the curing of the undercoat film and the applying of the topcoat material to form the topcoat film.

4. The method of claim 1, wherein
the volume expansion coefficient of the filler is ½ or less of the volume expansion coefficient of the base resin.

5. The method of claim 1, wherein
the filler is a spherical filler.

6. The method of claim 1, wherein
the filler is blended in the undercoat material in a ratio of 30% by volume or more to 45% by volume or less.

7. The method of claim 1, wherein
a matrix resin of the resin molded product is an epoxy-based resin, and
the base resin of the undercoat material is a urethane-based resin.

* * * * *